United States Patent
Pestka et al.

[11] 3,871,241
[45] Mar. 18, 1975

[54] TAKE-UP PULLEY

[75] Inventors: John August Pestka, Park Ridge; Richard Jay Lindeman, Elmwood Park, both of Ill.

[73] Assignee: Illinois Tool Works Inc., Chicago, Ill.

[22] Filed: Jan. 23, 1974

[21] Appl. No.: 435,794

[52] U.S. Cl......... 74/242.11 R, 74/230.3, 74/230.7, 74/230.8, 74/242.15 R
[51] Int. Cl. :... F16h 7/12, F16h 55/36, F16h 55/48
[58] Field of Search............ 74/242.15 R, 242.11 R, 74/242.11 C, 230.3, 230.7, 230.8

[56] References Cited
UNITED STATES PATENTS

| | | | |
|---|---|---|---|
| 3,050,929 | 8/1962 | Stahlecker | 57/105 |
| 3,295,383 | 3/1967 | Allen | 74/227 |
| 3,402,617 | 9/1968 | Fox | 74/425 |
| 3,464,282 | 9/1969 | Brobowski | 74/226 |
| 3,525,241 | 8/1970 | Morton | 68/23.7 |
| 3,636,786 | 1/1972 | Buck | 74/242.11 R |

*Primary Examiner*—Leonard H. Gerin
*Attorney, Agent, or Firm*—Olson, Trexler, Wolters, Bushnell & Fosse, Ltd.

[57] ABSTRACT

A take-up pulley is disclosed which is low in finished cost yet rugged in operation. A bearing support fork carries a one-piece tubular bearing between the fork tine ends. Fingers on the bearing engage slots on the fork tines to mount the bearing without expensive fasteners. An axially oriented bearing slot allows limited radial expansion and contraction of the bearing to provide resilient yet firm engagement with a pulley wheel. A medially disposed groove in the bearing mates with an annular pulley wheel ring to axially locate the pulley wheel on the bearing.

12 Claims, 7 Drawing Figures

3,871,241
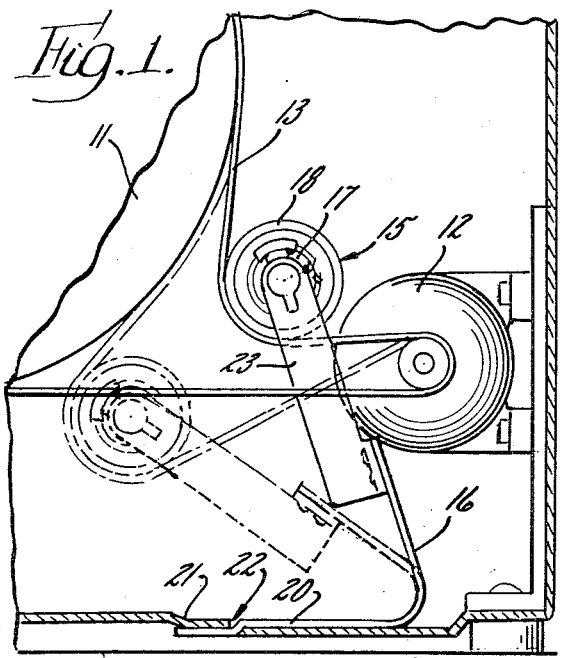
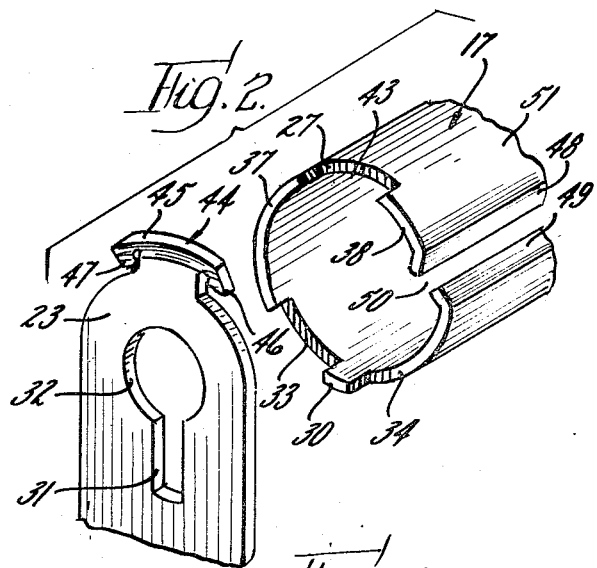
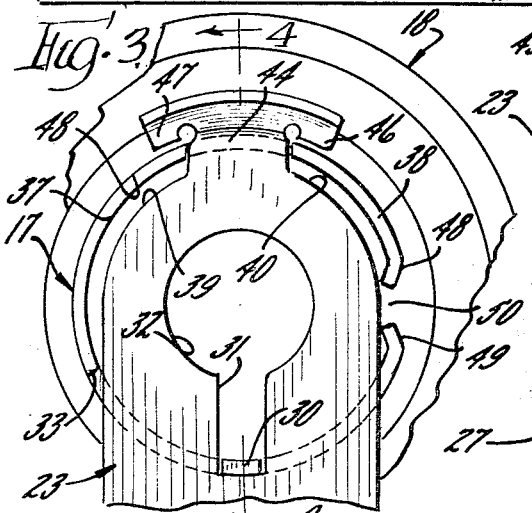
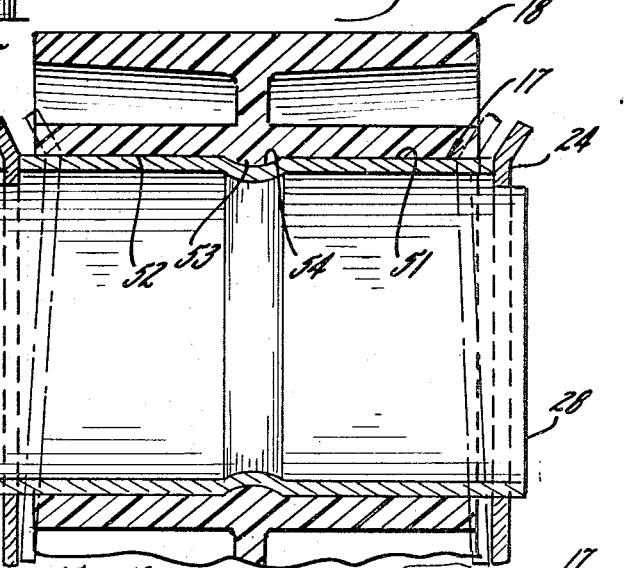
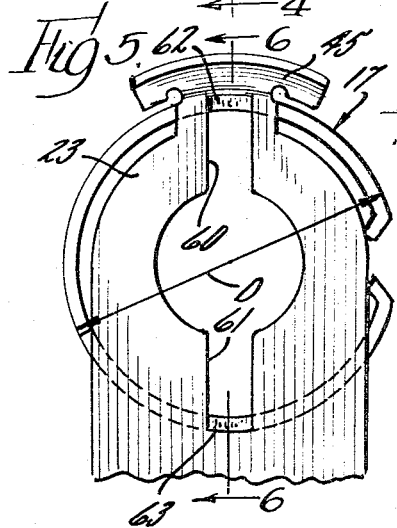
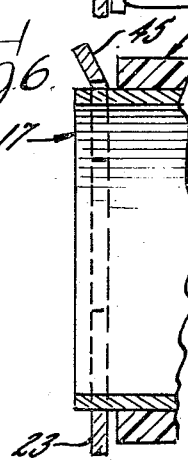
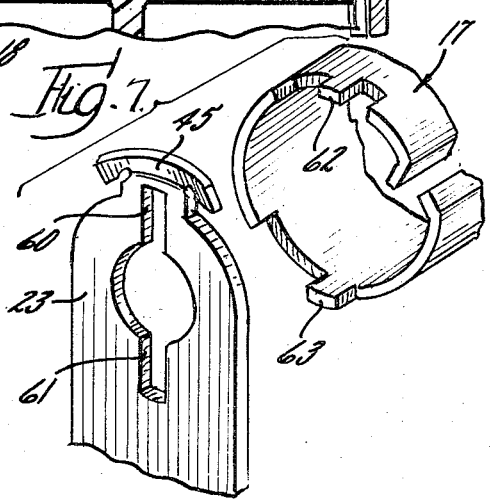

TAKE-UP PULLEY

BACKGROUND OF THE INVENTION

This invention relates generally to pulleys, and more particularly concerns a low cost take-up pulley especially adapted for use in washing machines, clothes dryers and like machinery.

It is the general object of the invention to provide a take-up or idler pulley at a low finished cost, yet which has a long service life, and which is rugged in its operation.

More specifically, it is the object of the present invention to provide a take-up pulley and related support structure requiring relatively few parts. A related object is to provide such a pulley wherein the parts can be manufactured and assembled at low cost.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is an elevational view showing the novel idler pulley as it appears when installed in a typical clothes dryer or like machine;

FIG. 2 is an exploded view showing the interrelationship of a pulley bearing end and bearing support;

FIG. 3 is an elevational view of the pulley, the pulley bearing, and the pulley bearing support member;

FIG. 4 is a sectional view taken substantially in the plane of line 4—4 in FIG. 3 showing the pulley, the pulley bearing, and the bearing support;

FIG. 5 is an elevational view similar to FIG. 3 and showing an alternate embodiment of the invention;

FIG. 6 is a sectional view of the alternate embodiment taken substantially in the plane of line 6—6 in FIG. 5; and FIG. 7 is an exploded view similar to FIG. 2 and showing the interrelationship of the alternate embodiment pulley bearing and bearing support member.

DETAILED DESCRIPTION

While the invention will be described in connection with preferred embodiments, it will be understood that it is not intended to limit the invention to these embodiments. On the contrary, it is intended to cover all alternatives, modifications and equivalents as may be included within the spirit and scope of the invention.

Turning first to FIG. 1, there is shown a typical machine or device utilizing the present invention, such as a clothes dryer 10 which includes a clothes-containing drum 11. The drum 11 is rotated by a motor 12 which powers a belt 13 looped over the drum 11. To tension the belt 13, the novel idler or take-up pulley 15 is provided.

The take-up pulley 15 is a low-cost, yet rugged mechanism, and to that end, the illustrated pulley 15 generally includes only a bearing support fork 16, a bearing 17, and a pulley wheel 18 rotatably disposed upon the bearing 17. For specialized use and increased sophistication, other parts may be added, of course, without departing from the invention.

As illustrated in FIG. 4, the bearing support fork member 16 is secured at a base 20 to a convenient stationary machine frame member 21, as by the illustrated slide connection 22, and its other end is provided with two tine members 23 and 24. In its unstressed or normal position, shown in dotted lines in FIG. 1, the bearing support fork 16 carries the pulley wheel 18 in a maximum slack take-up position. However, when the belt 13 is passed over the pulley wheel 18, the bearing support 16 is resiliently pulled into the position shown in solid lines in FIG. 1, but continues to urge the belt 13 and pulley wheel 18 back into the maximum slack take-up position against the action of the belt member 13. Before the bearing 16 is mounted between the tines 23 and 24, the tines assume the canted positions illustrated in phantom lines in FIG. 4, but when the bearing 17 is disposed between them, the bearing axial length forces the tines into generally parallel positions as shown.

The pulley wheel 18 is mounted between the tines 23 and 24 of the bearing support fork 16, by a bi-ended, one-piece cylindrical bearing 17. In accordance with the invention, low bearing manufacturing and assembly cost is encouraged by providing each bearing end 27 and 28 with at least one axially protruding, circumferentially located finger 30 for engaging a corresponding slot 31 formed in the abutting fork tine 23 to mount the bearing 17 on the bearing support 16, and to immobilize the bearing from rotational and radial motion relative to the fork tine 23 or 24. This slot 31 is elongated, and extends radially of the bearing 17 from a center portion 32 to form a keyhole-shaped aperture. Adjacent the finger 30, axially indented or recessed surfaces 33 and 34 are formed on the bearing periphery to abut the fork tine 23 and immobilize the bearing from axial motion relative to the fork tine 23.

In the illustrated embodiment, other axially extended fingers 37 and 38 are provided to abut, in shoulder-like arrangement, curved surfaces 39 and 40 which form the terminus of the finger tine 23. These curved shoulder interengagements assist in locating the bearing 17 on the tine 23 and in securing it from motion relative to the tine without cost-adding weldments or other fasteners.

Separating the fingers 37 and 38 is yet another recess 43 which accomodates an upstanding tine finger 44. The interengagement of this recess 43 and finger 44 further assist in preventing rotational or axial motion of the bearing 17 relative to the tine 23. To engage the outer surface 48 of the bearing 17 and help locate the bearing 17 on the finger tine 23, the finger 44 terminates in an inclined lip 45 which is provided with overhanging bearing-engaging shoes 46 and 47.

It will be understood that similar fingers, slots, recesses and lips are provided upon the opposite bearing support tine 24 and bearing end 28.

In accordance with yet another aspect of the invention, the low-cost bearing 17 is formed of a single material sheet rolled or otherwise formed in the shape of a hollow cylinder. Generally opposing material sheet ends 48 and 49 are turned inwardly as illustrated and are spaced apart to form an axially parallel slot 50 completely through an outer bearing surface 51. This slot 50 permits slight radial flexure of the bearing 17, thereby providing resilient yet firm engagement with an annular inner surface 52 formed on the pulley wheel 18. Moreover, pulley frictional drag can be adjusted or otherwise controlled with relative ease: the bearing can be radially deformed inwardly or outwardly a slight amount to lessen or increase frictional interengagement between the static bearing 17 and rotating pulley wheel 18.

It is a feature of the invention that the pulley wheel 18 is accurately located in an axial direction upon the bearing 17. To this end, the pulley wheel 18 is provided with an annular, radially inwardly extending ring 53 which is formed to mate with a bearing groove 54 medially disposed around the outer bearing surface 55. The interengagement of the pulley ring 53 and bearing groove 54 prevent axial displacement of the pulley wheel 18 on the bearing 17. If the pulley wheel 18 is cast of plastic or other material which may leave small amounts of flash during formation, this ring and groove arrangement will accommodate such flash without appreciable pulley wheel wobble or misalignment relative to the bearing and other parts.

A modified embodiment of the invention is illustrated in FIGS. 5–7, inclusive. Here, two radially elongated slots 60 and 61 are formed in generally diametrically opposed relationship upon the bearing support tine 23, and mating fingers 62 and 63 are formed upon the ends of the bearing 17. By controlling the extent or dimensional lengths of the slots 60 and 61, the locations of the diametrically opposed bearing fingers 62 and 63 are correspondingly controlled. With the diametric distance between these two fingers so controlled, the outer diameter D of the bearing itself is controlled and, in turn, the pulley drag or frictional interengagement between the bearing 17 and pulley wheel 18 can be set with relative precision.

The invention is claimed as follows:

1. An idler take-up pulley comprising a bearing support fork, a bearing and a pulley wheel, the bearing support fork being adapted for attachment to a frame and including biasing means for urging the pulley wheel toward a maximum slack take-up position against the action of a belt member passing over the pulley, the bi-ended, one-piece, cylindrical bearing being carried between the fork tines, each bearing end including at least one finger for engaging a slot in an abutting fork tine to mount the bearing on the fork and to immobilize the bearing from rotational motion relative to the fork tine, and at least one recessed surface for abutting the fork tine to immobilize the bearing from axial motion relative to the fork tine, and a groove medially disposed around the bearing surface, the pulley wheel having an annular radially inwardly extending ring mating with the bearing groove to axially locate the pulley on the bearing.

2. An idler take-up pulley according to claim 1 wherein said bearing comprises a hollow tube provided with a peripheral slit oriented parallel to the bearing axis to permit resilient expansion and contraction of the bearing diameter and resilient engagement of the bearing with an annular inner pulley wheel surface.

3. An idler take-up pulley according to claim 1 wherein said slot formed in the bearing support fork tine is extending in a radial direction to permit limited radial motion of the bearing finger and limited radial expansion and contraction of the bearing.

4. An idler take-up pulley according to claim 3 including two diametrically opposed radially elongated slots formed in said bearing support fork tine, and a bearing finger disposed in each of said slots at diametrically opposed locations upon the bearing.

5. An idler take-up pulley according to claim 1 wherein said biasing means are integrally included in said bearing support means.

6. An idler take-up pulley according to claim 1 wherein said bearing support fork is provided with two tine members urged away from one another into generally parallel positions by the length of the bearing member disposed between the tine members.

7. An idler take-up pulley according to claim 1 wherein said bearing member is provided with a plurality of fingers adapted to engage, in shoulder-like manner, curved surfaces formed upon the pulley tine for radially locating said bearing on said bearing support member.

8. An idler take-up pulley according to claim 1 including a finger terminating in a lip having depending shoes for engaging an outer bearing surface to assist in radially locating the bearing upon the bearing support member.

9. An idler take-up pulley comprising a bearing support fork, a bearing and a pulley wheel, the bearing support fork being adapted for attachment to a frame and including biasing means for urging the pulley wheel toward a maximum slack take-up position against the action of a belt member passing over the pulley, the bi-ended one-piece cylindrical bearing being carried between the fork tines, each bearing end including at least one finger for engaging an elongated slot formed in an abutting fork tine end, the elongated slot being oriented radially relative to the bearing to mount the bearing on the fork and to immobilize the bearing from rotational motion relative to the fork tine, yet permitting resilient radial expansion and contraction of the bearing, and at least one recess formed upon the bearing for abutting the fork tine to immobilize the bearing from axial motion relative to the fork tine, the pulley being journaled upon the bearing for engaging a belt member.

10. An idler take-up pulley according to claim 9 wherein said bearing member is a hollow tube provided with a slot extending completely through one bearing side and oriented parallel to the bearing axis to permit resilient radial extension and contraction of the bearing within the pulley.

11. An idler take-up pulley according to claim 9 wherein one of said bearing and pulley wheel members is provided with a medially disposed radially inwardly extending ring, and said other member is provided with a medially disposed groove adapted to mate with said ring to axially locate the pulley wheel on the bearing.

12. An idler take-up pulley according to claim 11 wherein said groove is adapted to accommodate at least small portions of flash material formed upon the pulley wheel.

* * * * *